US011955014B2

(12) United States Patent
Puskar et al.

(10) Patent No.: US 11,955,014 B2
(45) Date of Patent: Apr. 9, 2024

(54) ADS-B TRAFFIC FILTER

(71) Applicant: Honeywell International s.r.o., Praha Chodov (CZ)

(72) Inventors: Martin Puskar, Prague (CZ); Jan Flasar, Prague (CZ); Tomas Kralicek, Brno (CZ); Stephane Marche, Toulouse (FR); Gang He, Morris Plains, NJ (US)

(73) Assignee: Honeywell International s.r.o., Praha Chodov (CZ)

( * ) Notice: Subject to any disclaimer, the term of this patent is extended or adjusted under 35 U.S.C. 154(b) by 0 days.

(21) Appl. No.: 17/589,608

(22) Filed: Jan. 31, 2022

(65) Prior Publication Data

US 2023/0245572 A1 Aug. 3, 2023

(51) Int. Cl.
*G08G 5/00* (2006.01)
*G08G 5/04* (2006.01)

(52) U.S. Cl.
CPC ......... *G08G 5/0021* (2013.01); *G08G 5/0073* (2013.01); *G08G 5/04* (2013.01)

(58) Field of Classification Search
CPC ....... G08G 5/0021; G08G 5/0073; G08G 5/04
See application file for complete search history.

(56) References Cited

U.S. PATENT DOCUMENTS 7,414,567 B2 8/2008 Zhang et al.
7,880,667 B2 2/2011 Lanzkron
9,218,741 B2 12/2015 Wu et al.
(Continued)

FOREIGN PATENT DOCUMENTS

CN 110347668 A * 10/2019 ........... G06F 16/215
CN 110347668 A 10/2019
(Continued)

OTHER PUBLICATIONS

"Overview of Automatic Dependent Surveillance-Broadcast (ADS-B) Out", ICAO, Retrieved from: https://www.icao.int/NACC/Documents/Meetings/2021/ADSB/P01-OverviewADSBOut-ENG.pdf, Retrieved on Dec. 6, 2021, 31 pp.
(Continued)

*Primary Examiner* — Curtis A Kuntz
*Assistant Examiner* — James E Munion
(74) *Attorney, Agent, or Firm* — Shumaker & Sieffert, P.A.

(57) ABSTRACT

An ADS-B traffic filter to remove ADS-B positional messages or tracks with unstable ADS-B data or anomalies. The anomaly in ADS-B data can be caused by own ship ADS-B data processing and by errors in ADS-B OUT messages, such as positional outliers, ADS-B OUT parameters gaps, frozen data, walking track when stopped and other issues within ADS-B OUT messages. The ADS-B traffic filter of this disclosure may remove erroneous ADS-B targets from computation input delivered to a traffic collision warning systems in locations where high horizontal position accuracy is desirable such as ground operations. The filter may validate positions decoded from received ADS-B OUT messages, and data history of targets, to independent signal components from ADS-B broadcast (e.g., position and ground speed data), as well as compare the reported position with a reasonability bound provided by local runway or airport geometry data.

17 Claims, 7 Drawing Sheets

(56) References Cited

U.S. PATENT DOCUMENTS

| | | | | |
|---|---|---|---|---|
| 10,795,016 | B2 * | 10/2020 | Hauswald | G08G 5/0008 |
| 10,839,698 | B1 * | 11/2020 | Chaubey | G01C 23/00 |
| 11,495,134 | B2 * | 11/2022 | Liu | G01S 15/93 |
| 2011/0231096 | A1 | 9/2011 | Ridenour, II | |
| 2013/0229298 | A1 | 9/2013 | Eckstein et al. | |

FOREIGN PATENT DOCUMENTS

| | | | |
|---|---|---|---|
| CN | 112509383 | A | 3/2021 |
| CN | 113257044 | A | 8/2021 |
| CN | 113344093 | A | 9/2021 |
| EP | 3757970 | A1 | 12/2020 |
| EP | 3910614 | A1 | 11/2021 |

OTHER PUBLICATIONS

Puskar et al., "Airport Surface Alerts System (SURF IA)", Sesar Joint Undertaking, Retrieved from: https://www.sesarju.eu/sites/default/files/documents/events/wac2018/wt5%20SurfIA_WAC_2018_final.pdf, SESAR Joint Undertaking, Mar. 6, 2018, 10 pp.

Extended Search Report from counterpart European Application No. 23150439.0 dated Jun. 23, 2023, 8 pp.

Response to Extended Search Report dated Jun. 23, 2023, from counterpart European Application No. 23150439.0 filed Jan. 30, 2024, 22 pp.

* cited by examiner

ADS-B TRAFFIC FILTER

The project leading to this application has received funding from the SESAR Joint Undertaking under grant agreement No 874476 under European Union's Horizon 2020 research and innovation programme.

TECHNICAL FIELD

The disclosure relates to traffic collision avoidance systems for aircraft.

BACKGROUND

Some traffic collision warning systems, such as the Traffic Collision Avoidance System (TCAS), may also use information from Automatic Dependent Surveillance-Broadcast (ADS-B) messages, as well as the TCAS interrogations. TCAS-equipped aircraft send interrogation messages on the 1030 MHz radio frequency to all other aircraft in a determined range about the aircraft's position. A transponder on the other aircraft replies to the interrogation message with a response message on 1090 MHz that includes information that may include position, speed, and altitude. This TCAS interrogation-and-response cycle may occur up to several times per second. The TCAS system builds a three dimensional map of aircraft in the airspace, incorporating the range, e.g., calculated from the interrogation and response round trip time and bearing based on analyzing the response message with a directional antenna on the aircraft. TCAS calculates current range and altitude difference to anticipated future values, to determine if a potential collision threat exists.

Traffic collision warning systems may be used to prevent mid-air collisions, such as TCAS, as well as other systems, including SURF IA, SURF-A, and so on, to prevent collisions during ground operations, such as taxi, take-off and landing. The Airport Surface Traffic Indications and Alerts system (SURF-IA), and similar systems may also use ADS-B messages to determine aircraft positions and predict possible collisions on the ground. ADS-B includes both ADS-B OUT and ADS-B IN messages. ADS-B OUT messages are transmitted from aircraft equipped with ADS-B transponders, containing information such as identity, location, and velocity. The ADS-B OUT messages are broadcast on the 1090 MHz radio frequency and may also transmitted using a Universal Access Transceiver (UAT) in the 978 MHz band. Aircraft equipped with ADS-B IN receivers may send the received ADS-B OUT messages to one or more on board traffic collision warning systems for further display or alerts for the flight crew.

SUMMARY

In general, the disclosure describes a system that may be added to existing aircraft collision warning systems that includes an ADS-B traffic filter to remove/filter ADS-B positional messages or tracks when any unstable ADS-B data or anomaly is detected based on a few parameters as ground speed and existing eligibility flags. The anomaly in ADS-B data can be caused by own ship ADS-B data processing as well as by errors in ADS-B OUT messages, for example, caused by any one or more of receiver signal multipath from satellites, which may generate positional outliers, ADS-B OUT parameters gaps, frozen data, walking track when stopped and other issues that may be encoded within ADS-B OUT messages. For example, a Global Navigation Satellite Systems (GNSS), such as the Global Positioning System (GPS) may output erroneous position information, e.g., when an aircraft is stopped, which may be caused by receiver multi-path issues of received satellite signals. The positional errors may be encoded in the ADS-B OUT message.

Some traffic collision warning systems may have standards for a safety level for high horizontal position accuracy, particularly traffic collision warning systems for use during ground operations. The ADS-B traffic filter of this disclosure may remove spurious and erroneous ADS-B targets from computation input delivered to a traffic collision warning systems, such as for SURF IA. By removing erroneous information from the computations used to predict possible collisions, the ADS-B traffic filter of this disclosure may reduce the probability of generating false alerts, and providing a solution not limited by input signal quality, such as from the received ADS-B OUT message. The ADS-B traffic filter of this disclosure may validate and compare input positions, decoded from received ADS-B OUT messages, and short duration data history of targets to independent signal components from ADS-B broadcast (e.g., position and ground speed data), as well as compare the reported position with a reasonability bound provided by local runway data or airport geometry data. The reasonability bound comparison may include information such as known runway position and geometry. A target position reasonableness check may also include adjustable time window and spatial positioning uncertainty range to allow for optimal selections of target reasonableness for inclusion into the data sent to a traffic collision warning system, e.g., SURF IA for threat condition computation.

In one example, this disclosure describes a system comprising processing circuitry configured to: receive traffic data comprising target state information of a target derived from received Automatic Dependent Surveillance-Broadcast (ADS-B) messages, wherein the target state information comprises target location, target heading and target speed; filter the received traffic data to remove data points from the received traffic data by performing the following steps: receive a data point comprising the target state information; perform a positional outlier check on the received data point, wherein the positional outlier check comprises to check consistency of a respective location, respective heading and respective speed information between successive data points; perform a track validity check of a track of the target based on the received data point, wherein the track validity check comprises to check the target location and heading against known geometry; in response to determining that the track of the target is invalid, remove the target from the traffic data; and in response to determining that the track of the target is valid and in response to determining that the received data point is a positional outlier, then: delete the received data point and add a previous data point to the traffic data; and output an electronic signal comprising the traffic data as filtered traffic data.

In another example, this disclosure describes a method comprising receiving, by processing circuitry, traffic data comprising target state information of a target derived from received Automatic Dependent Surveillance-Broadcast (ADS-B) messages, wherein the target state information comprises target location, target heading and target speed; filtering, by processing circuitry, the received traffic data to remove data points from the received traffic data by performing the following steps: receiving a data point comprising the target state information; performing a positional outlier check on the received data point, wherein the positional outlier check comprises to check consistency of a respective location, respective heading and respective speed information between successive data points; performing a track validity check of a track of the target based on the received data point, wherein the track validity check comprises to check the target location and heading against known geometry; in response to determining that the track of the target is invalid, removing the target from the traffic data; and in response to determining that the track of the target is valid and in response to determining that the received data point is a positional outlier, then: deleting the received data point and adding a previous data point to the traffic data; and outputting an electronic signal comprising the traffic data as filtered traffic data.

In another example, this disclosure describes a non-transitory computer-readable storage medium comprising instructions that, when executed, cause one or more processors of a computing device to: receive traffic data comprising target state information of a target derived from received Automatic Dependent Surveillance-Broadcast (ADS-B) messages, wherein the target state information comprises target location, target heading and target speed; filter the received traffic data to remove data points from the received traffic data by performing the following steps: receive a data point comprising the target state information; perform a positional outlier check on the received data point, wherein the positional outlier check comprises to check consistency of a respective location, respective heading and respective speed information between successive data points; perform a track validity check of a track of the target based on the received data point, wherein the track validity check comprises to check the target location and heading against known geometry; in response to determining that the track of the target is invalid, remove the target from the traffic data; and in response to determining that the track of the target is valid and in response to determining that the received data point is a positional outlier, then: delete the received data point and add a previous data point to the traffic data; and output an electronic signal comprising the traffic data as filtered traffic data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
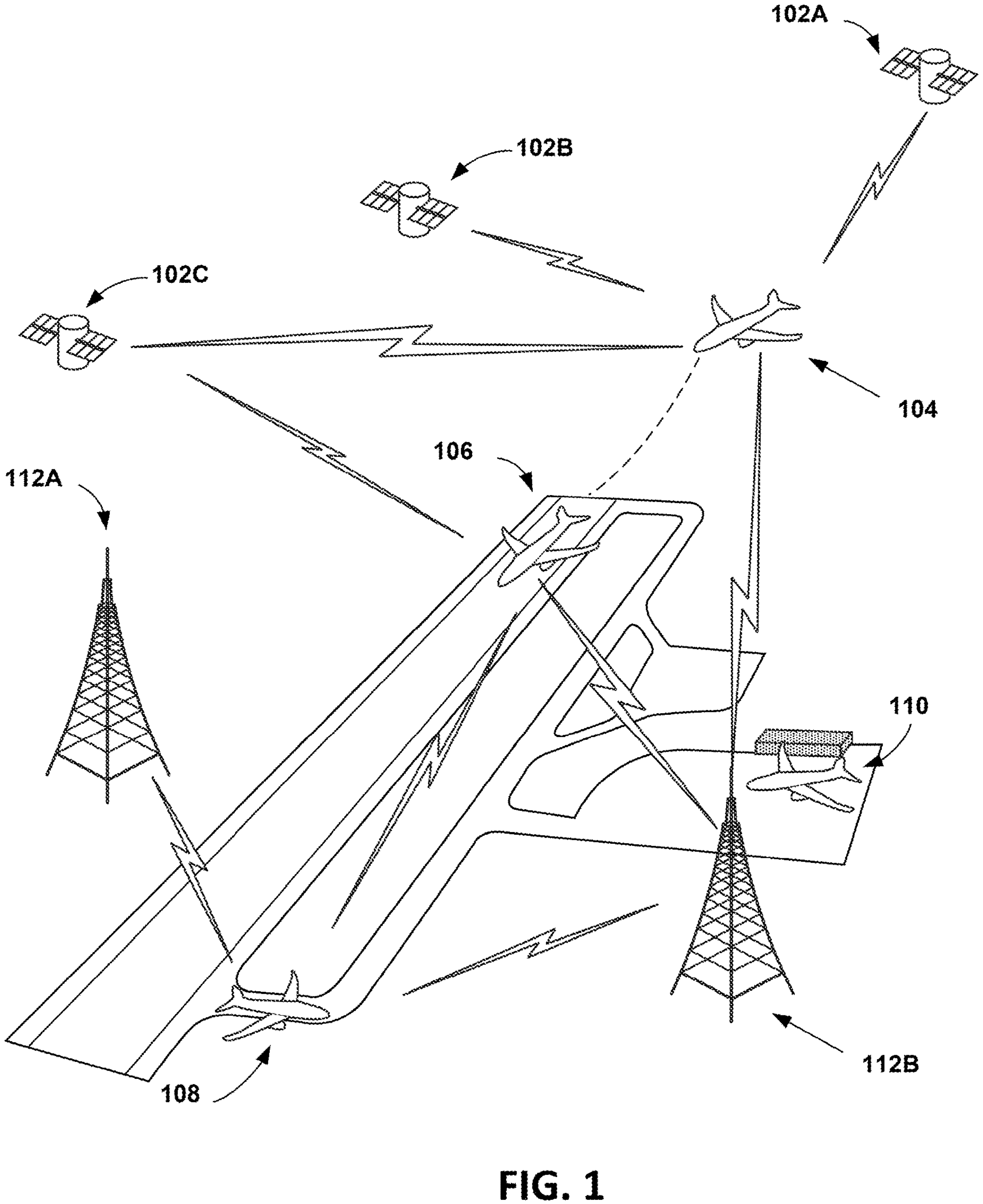
FIG. 1 is a conceptual diagram illustrating an example airport environment including one or more aircraft that employ the traffic filter system of this disclosure.

The disclosure describes an improvement to aircraft onboard traffic collision systems for use in situations in which horizontal accuracy is a factor, such as operations on or near an airport. Horizontal accuracy may be less of a factor during cruise flight for example, because of larger separation distances and greater maneuverability during cruise when compared with near airport operations. This disclosure describes techniques to remove erroneous data points from traffic data received by an own-ship traffic collision system from one or more target aircraft, or other vehicles. Traffic collision systems, such as SURF IA, may perform prediction calculations using the received data points to determine whether a target poses a collision risk. In this disclosure, “SURF-IA” may be used as a generic term to refer to any of the several surface collision warning systems, e.g., as defined by RTCA DO-323.

An erroneous datapoint may cause a nuisance prediction resulting in, for example, a calculated collision risk where there is no actual collision risk, or the system failing to predict an actual collision risk. Such nuisance predictions may result in undesirable behavior from the crew operating a vehicle, e.g., performing an avoidance maneuver where none is needed, performing an incorrect avoidance maneuver, or failing to take action when action is needed. The techniques of this disclosure may apply to manned aircraft, remotely piloted unmanned aerial vehicles (UAV), as well as to ground vehicles operating near aircraft. The techniques of this disclosure may be used in conjunction with other existing techniques for ensuring signal quality of transmitted data points.

The input to traffic collision systems includes transmitted ADS-B OUT messages from target vehicles, e.g., ground vehicles and aircraft. The ADS-B traffic filter of this disclosure may receive and store a short duration data history of targets. The ADS-B traffic filter may validate and compare input positions, decoded from received ADS-B OUT messages and the stored short duration data history of targets to independent signal components from ADS-B broadcast (e.g., position and ground speed data) to detect outlier position data points. The ADS-B traffic filter may also compare the reported position decoded from the ADS-B data point with a reasonability bound provided by local runway data or airport geometry data. The reasonability bound comparison may include information such as known runway position and geometry. The target position reasonableness check, e.g., a track validity check, may also include adjustable time window and spatial positioning uncertainty range to allow for optimal selections of target reasonableness. The ADS-B traffic filter may remove data points determined to be erroneous from the data sent to the traffic collision warning system, e.g., SURF IA, which may perform the threat condition computation. The ADS-B traffic filter may also take into account when the own-ship or the target is operating on or near a runway, because unlike slow ground speed operations, for example, near a terminal area of an airport, operations near a runway may involve a risk of a high speed collision.

FIG. 1 is a conceptual diagram illustrating an example airport environment including one or more aircraft that employ the traffic filter system of this disclosure. Aircraft and other vehicles operating near the airport may receive position information from, for example one or more Global Navigation Satellite Systems (GNSS), such as the Global Positioning System (GPS). A constellation of satellites 102A, 102B, 102C, and other satellites not shown in FIG. 1, may output signals received by the aircraft and used to calculate their location, speed, altitude and so on. In some examples the signals from the satellites may be subject to multi-path issues, including reflections off airport structures such as hangars, other aircraft and so on that may cause location inaccuracy.

Aircraft, and other vehicles, may receive ADS-B IN signals from other vehicles describing the vehicle location, altitude, speed, heading and so on. In some examples, ADS-B IN signals may come directly from the transmitting vehicle, e.g., from aircraft 104 to aircraft 106, and vice versa. In other examples, ADS-B IN signals may come from ADS-B ground stations, e.g., ground stations 112A and 112B. Because any location errors from the GPS is encoded in the ADS-B message from the target, the own-ship vehicle cannot validate and check for multipath or other GPS errors. Many different GPS receiver manufactures may have differences in sensitivity, error correction and other functions. In some examples, data points that may be corrupted or erroneous may be referred to as jams, or jammed data.

In some examples, the ADS-B OUT signals broadcast from the vehicles may include inaccuracies, such as the GPS issues described above. In some examples, ADS-B system inaccuracy in the transmitted ADS-B messages may cause nuisance alerts from traffic collision warning systems for an aircraft. Some of received traffic data may be erroneous and should not be used in the prediction algorithms of the traffic collision warning systems. In some examples, the traffic collision systems may be onboard an aircraft, or other vehicle, and may process traffic data received via ADS-B to provide an alert to the vehicle operator, e.g., the flight crew of an aircraft. In the example of an unmanned aerial vehicle (UAV), in some examples, the traffic collision warning system may be onboard the UAV, similar to an onboard traffic collision warning system for a manned aircraft. In other examples, traffic collision system for the vehicle may be at some other location, such as a ground control station for the UAV. In either case, the traffic collision alerting system may provide alerts to the vehicle operator. In this disclosure a traffic collision warning system may also be referred to as a traffic collision system or a collision system.

As noted above, aircraft may be operating on a runway, e.g., aircraft 106, or near a runway, e.g., aircraft 108 as well as aircraft 104 approaching the runway. Aircraft operating on or near a runway may be in a high-energy state, such as accelerating for take-off or decelerating from landing. Receiving a nuisance alert may cause an undesirable response from the vehicle operator for a non-existent collision threat. For example, aircraft 106 may be in a high energy state, e.g., a take-off state, based on the aircraft acceleration, speed, engine status and so on. In the event aircraft 106 receives a nuisance alert that aircraft 108 is on the runway, when aircraft 108 is actually clear of the runway, then the flight crew for aircraft 106 may unnecessarily abort the take-off.

The ADS-B traffic filter for an own-ship vehicle of this disclosure may remove ADS-B positional messages or tracks from traffic data sent to a traffic collision warning system, such as SURF-IA, that may cause nuisance alerts from the traffic collision warning system. The ADS-B traffic filter of this disclosure may provide advantages to traffic collision warning systems where the own-ship vehicle is operating in an area where accurate horizontal position accuracy may be desirable, such as on or near an airport.

In some examples, the ADS-B traffic filter may be implemented as a stand-alone device, for example, including processing circuitry, memory with programming instructions and data storage, connection and communication circuitry, power supply circuitry and so on. The stand-alone device may connect between the ADS-B IN receiving circuitry and the traffic collision warning system to filter erroneous data points from the traffic data. In other examples, the ADS-B traffic filter may include programming instructions executable by existing processing circuitry, e.g., that is part of an aircraft avionics. The existing processing circuitry may perform the ADS-B traffic filtering functions. In some examples, processing circuitry of the traffic collision warning system may execute the ADS-B traffic filter functions described herein.

Figure 2:
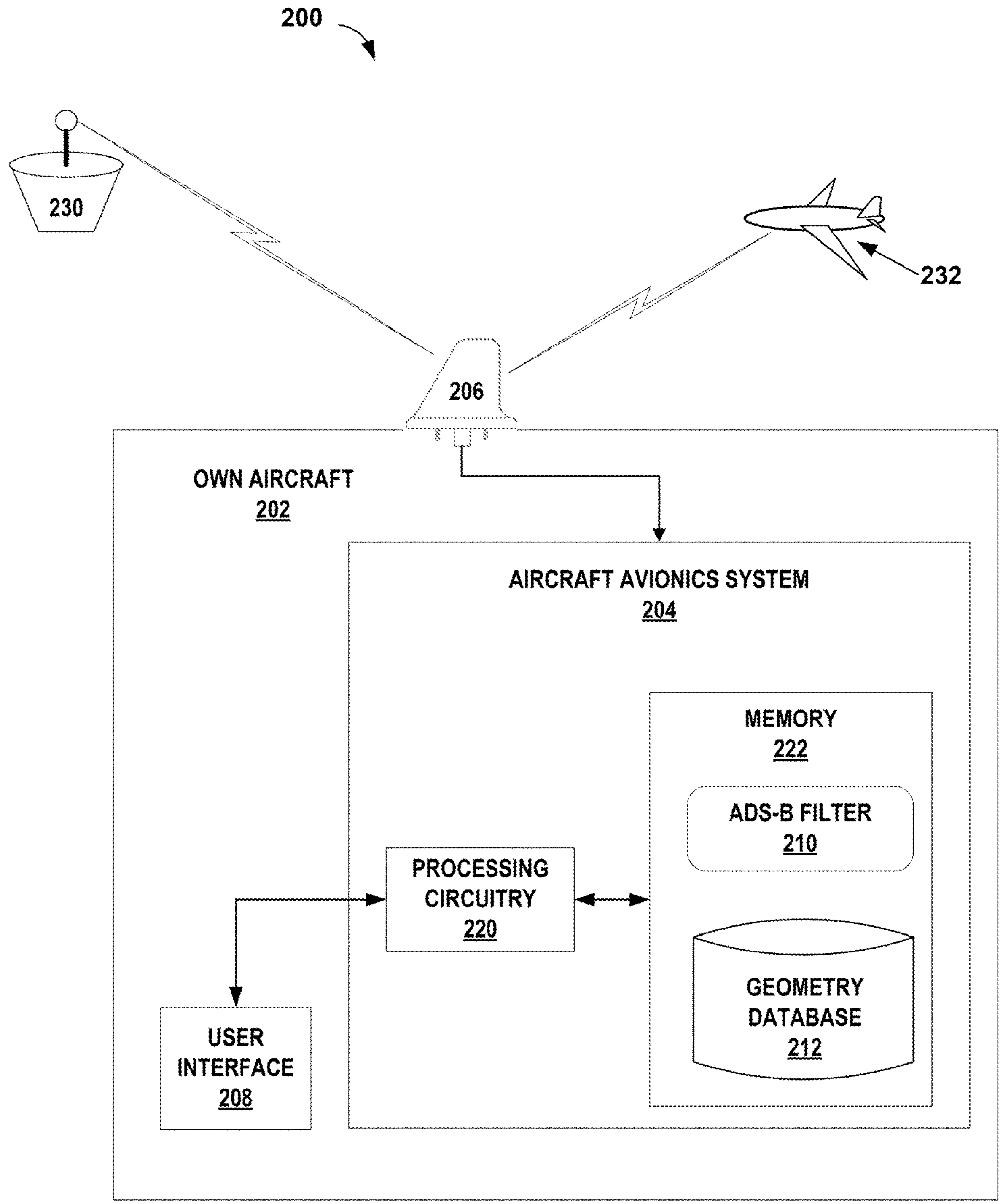
FIG. 2 is a block diagram illustrating one possible example implementation of the traffic filter of this disclosure, included in software for an on-board avionics system.

FIG. 2 is a block diagram illustrating one possible example implementation of the traffic filter of this disclosure, included in programming instructions for an on-board avionics system. As described above in relation to FIG. 1, in other examples, the ADS-B traffic filter may be a stand-alone device (not shown in FIG. 2). The example of system 200 in FIG. 2 includes own aircraft 202 with ADS-B antenna 206 configured to receive ADS-B signals from other vehicles, e.g., aircraft or UAV 232, or from other vehicles via ground station 230. Own aircraft 202 includes aircraft avionics system 204 with processing circuitry 220, memory 222 as well as other sensors, controllers, actuators, and so on not shown FIG. 2. Aircraft avionics system 204 may connect to one or more user interfaces 208. User interfaces 208 may display information as well as receive input from the flight crew.

Examples of processing circuitry 220 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Examples of memory 222 may include any type of non-transitory computer-readable storage media, such as random access memory (RAM), read only memory (ROM), programmable read only memory (PROM), erasable programmable read only memory (EPROM), one-time programable (OTP) memory, electronically erasable programmable read only memory (EEPROM), flash memory, or another type of volatile or non-volatile memory device. In some examples the computer readable storage media may store instructions that cause processing circuitry 220 to execute the functions described herein. In some examples, the computer readable storage media may store data, such as configuration information, temporary values and other types of data used to perform the functions of this disclosure.

Processing circuitry 220 may receive traffic data comprising target state information of a target, e.g., aircraft 232, derived from received ADS-B messages. The target state information may include target location, target heading and target speed. In some examples, the ADS-B receiving circuitry of aircraft avionics system 204 may check for required message elements including latitude and longitude, velocity, barometric and geographical altitude, flight identification, correct formatting such as for the International Civil Aviation Organization (ICAO) 24-bit address, emitter category, length/width code, and other message elements.

Processing circuitry 220 may execute programming instructions for ADS-B traffic filter 210 stored at memory 222 to filter the received traffic data to remove data points from the received traffic data. For example, processing circuitry may receive a data point comprising the target state information. In some examples, a target vehicle may output ADS-B signals that provide a new data point every second, twice per second or every few seconds, depending on the target vehicle state, location, speed, and so on.

Processing circuitry 220 may perform a positional outlier check on the received data point. The positional outlier check comprises to check consistency of a respective location, respective heading and respective speed information between successive data points. Previously received data points for each target may be stored in memory 222 in a monitoring window, e.g., a data point queue. Processing circuitry 220 may calculate an estimated heading and speed between successive locations and compare the calculated estimations to the reported heading and speed as part of the positional outlier check. In other words, processing circuitry 220 validates the input position signal by comparison to the short duration data history using independent signal components from the ADS-B OUT broadcast e.g., target position, ground speed data and so on.

Processing circuitry 220 may also perform a track validity check of the target based on the received data point. The track validity check may include to check the target location and heading against known geometry, e.g., including a heading consistency check. In some examples, processing circuitry 220 may pull data from geometry database 212 and compare the reported position to airport features described by geometry database 212. In some examples, geometry database 212 may include geometry of one or more airport features where the geometry may include length, width, height, geographical location, altitude, orientation and so on. Some examples of airport features may include runway location, heading and dimensions, taxiway and ramp location and dimensions, airport structure location and dimensions, such as hangars, passenger and freight terminals, fuel storage, location and dimensions of terrain and other hazards, aircraft arrival and departure paths and so on.

For example, the track validity check may flag an error if an aircraft reports a location in the middle of the passenger terminal, or a position on a runway or taxiway, but a heading that is not aligned with the reported runway or taxiway. The track validity check may be considered a track accuracy check, or a track consistency check against a known geometry. The track validity check of the ADS-B traffic filter of this disclosure may provide a reasonability bound by comparison to local runway data and other airport geometry data. This target position reasonableness check may include an adjustable time window and spatial positioning uncertainty range for selections of target reasonableness for inclusion into SURF IA threat condition computation.

In response to determining that the track of the target is invalid, processing circuitry 220 may remove the target from the traffic data. In other words, the traffic data sent to the traffic collision warning system, e.g., SURF IA, may not include information from the target, and thereby avoid a nuisance warning to the own-ship about the target. In some examples, the removed target may still be displayed to the vehicle operator for targets that meet other display eligibility requirements.

In other examples, in response to determining that the track of the target is valid and in response to determining, based on the above positional outlier check, that the received data point is a positional outlier, then processing circuitry 220 may delete the received data point and add a previous data point to the traffic data. Processing circuitry 220 may then output an electronic signal comprising the traffic data as filtered traffic data to be used by the traffic collision warning system.

Figure 3:
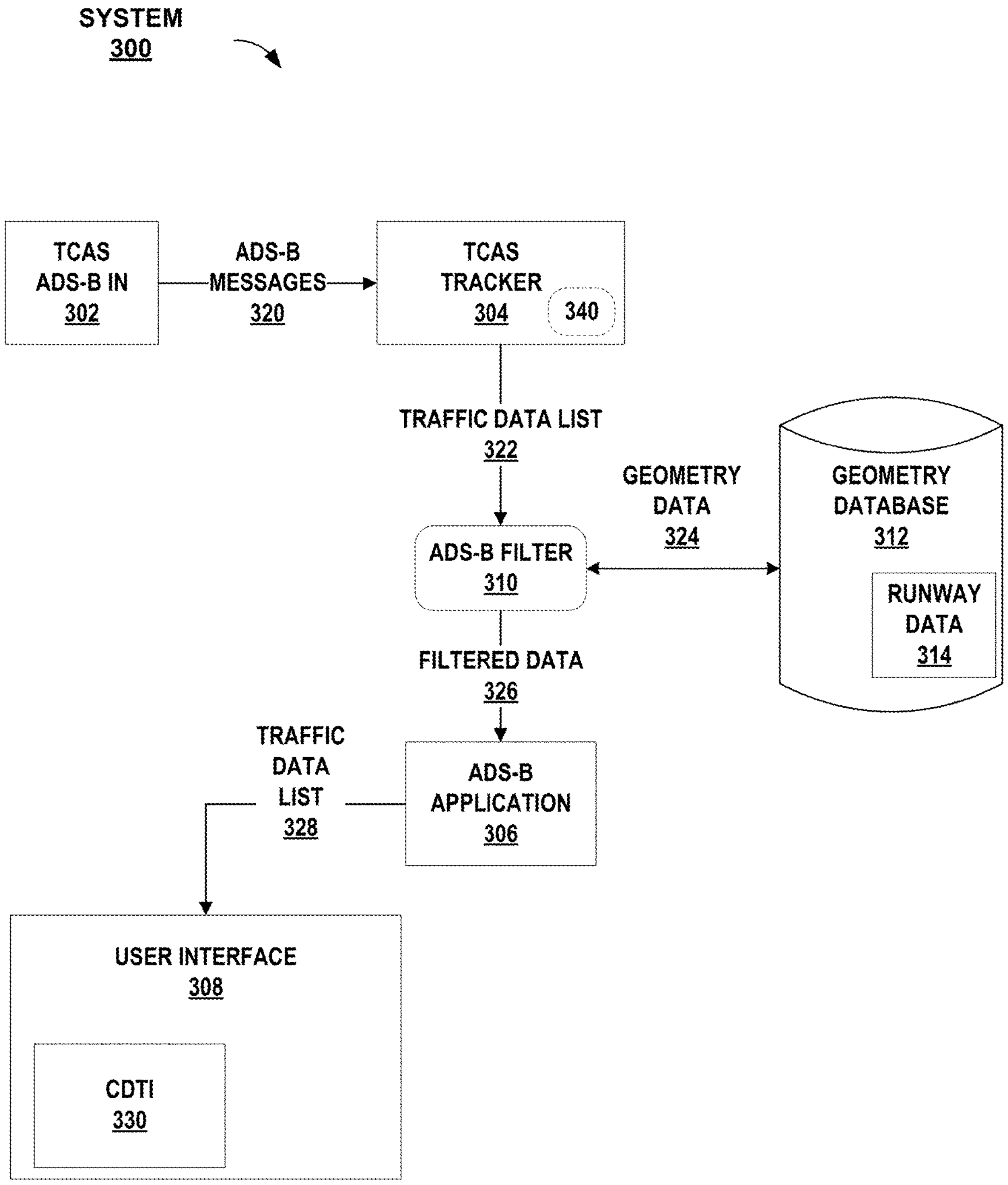
FIG. 3 is a block diagram illustrating another example implementation of the traffic filter of this disclosure.

FIG. 3 is a block diagram illustrating another example implementation of the traffic filter of this disclosure. The ADS-B traffic filter functions of system 300 is an example of the ADS-B traffic filter described above in relation to FIGS. 1 and 2. As described above in relation to FIGS. 1 and 2, the ADS-B filter of this disclosure may be implemented as a separate device, e.g., as ADS-B filter 310 shown in the example of FIG. 3, and may include separate processing circuitry, memory and so on (not shown in FIG. 310). In other examples, one or more features of the ADS-B traffic filter may be implemented by existing processing circuitry, e.g., as depicted by 340 in TCAS tracker 304, and as described above in relation to the example of FIG. 2.

Similar to FIG. 2 described above, system 300 may receive ADS-B messages 320 via TCAS ADS-B IN receiver 302. TCAS ADS-B IN receiver 302 may include one or more antennae, e.g., antenna 206 depicted in FIG. 2. TCAS tracker 304 may receive ADS-B messages 320 and identify which targets may be of concern to the own-ship for system 300. As described above in relation to FIG. 1, in some examples system 300 may be aboard a vehicle, such a fuel truck, supply vehicle or other ground vehicle as well as on board manned aircraft. In other examples one or more components of system 300 may be implemented by processing circuitry at a separate location, such as a ground station for a UAV.

TCAS tracker 304 may be a passive tracker of the ADS-B system that identifies targets of concern to the own-ship vehicle. In other words, TCAS tracker 304 may receive ADS-B traffic data from many other vehicles. TCAS tracker 304 may function to provide warnings, or alerts that focus only those vehicles that may pose a threat to the own ship. However, TCAS tracker 304 may not be able to filter out and determine whether the received traffic data is erroneous. For example, the TCAS tracker may interpret erroneous messages broadcast an aircraft as a threat and may alert the flight crew, which may trigger unnecessary workload to evaluate a non-existent nuisance threat, or in some examples, may trigger unnecessary evasive maneuvers, as described above in relation to FIG. 1. In some examples, existing TCAS trackers for ADS-B IN applications have been designed primarily for airborne application with limited function for surface traffic. Traffic eligibility rules based on navigational accuracy category for position (NACp) as per RTCA DO-317C may not resolve all the traffic GNSS receiver issues encoded in ADS-B out messages in situations where horizontal accuracy has a tighter tolerance when compared to cruise flight. ADS-B traffic filter 310 may add additional functionality to remove spurious and erroneous ADS-B targets from computation input for SURF IA computations, thereby reducing the probability of generating false alerts, and providing an advantages that are not limited by input signal quality (e.g., NACp) eligibility checks. In other words, ADS-B filter 310 may further filter the traffic data list 322 from TCAS tracker 304 for erroneous data points and targets, and output filter data 326 to ADS-B application 306, which may include prediction algorithms to perform threat calculations and generate alerts when needed.

As described above in relation to FIG. 2, ADS-B filter 310 may remove data points from traffic data list 322 received from TCAS tracker 304. In the example of FIG. 3, ADS-B filter 310 may be implemented as a stand-alone device with connections to TCAS tracker 304, geometry database 312, and other systems such as ADS-B application 306. In some examples, ADS-B filter 310 may include processing circuitry, memory with programming instructions and data storage, power supply circuitry along with the connections and communication circuitry, and so on, which is not shown in FIG. 3. In other words, as described above in relation to FIG. 2, the stand-alone device including ADS-B filter 310 may connect between the ADS-B IN receiving circuitry and the traffic collision warning system to filter erroneous data points from the traffic data.

As described above in relation to FIGS. 1 and 2, ADS-B filter 310 may perform positional outlier checks, track validity checks and so on to determine whether a received data point in traffic data list 322 should be passed on to a collision warning system, e.g., ADS-B application 306. ADS-B filter 310 may send queries and receive data from geometry database 312, including runway data 314, to perform the track validity checks, including check the target location and heading against known geometry of runways, taxiways and other features on or near an airport, as described above in relation to FIG. 2.

ADS-B filter 310 may remove the target from the traffic data, output as filtered data 326, in response to determining that the track of the target is invalid when compared to known geometry listed in geometry database 312. As described above in relation to FIG. 2, in some examples, even targets removed from filtered data 326, which is used by the collision warning system prediction calculations, may still be presented to the vehicle operator for targets that meet other display eligibility requirements.

In response to determining that the track of the target is valid and in response to determining that the received data point is a positional outlier, then ADS-B filter 310 may delete the received data point and add a previous data point to the traffic data; and output an electronic signal, e.g., filtered data 326, that includes the traffic data as filtered traffic data with the removed erroneous data points.

ADS-B application 306, e.g., SURF-IA or other threat tracking application that uses ADS-B traffic data, may perform calculations on filtered data 326 to determine whether to deliver an alert to the vehicle operator, e.g., flight crew. Processing circuitry for ADS-B application 306 may output traffic data list 328 to user interface 308, which may include one or more controls (buttons, knobs, touchscreen and so on) and one or more displays including a cockpit display of traffic information (CDTI) 330. In some examples, CDTI 330 may display ADS-B target information (ID, speed, altitude, vector and so on) along the aircraft flight path, increasing the situational awareness of the pilot or other vehicle operator.

Figure 4:
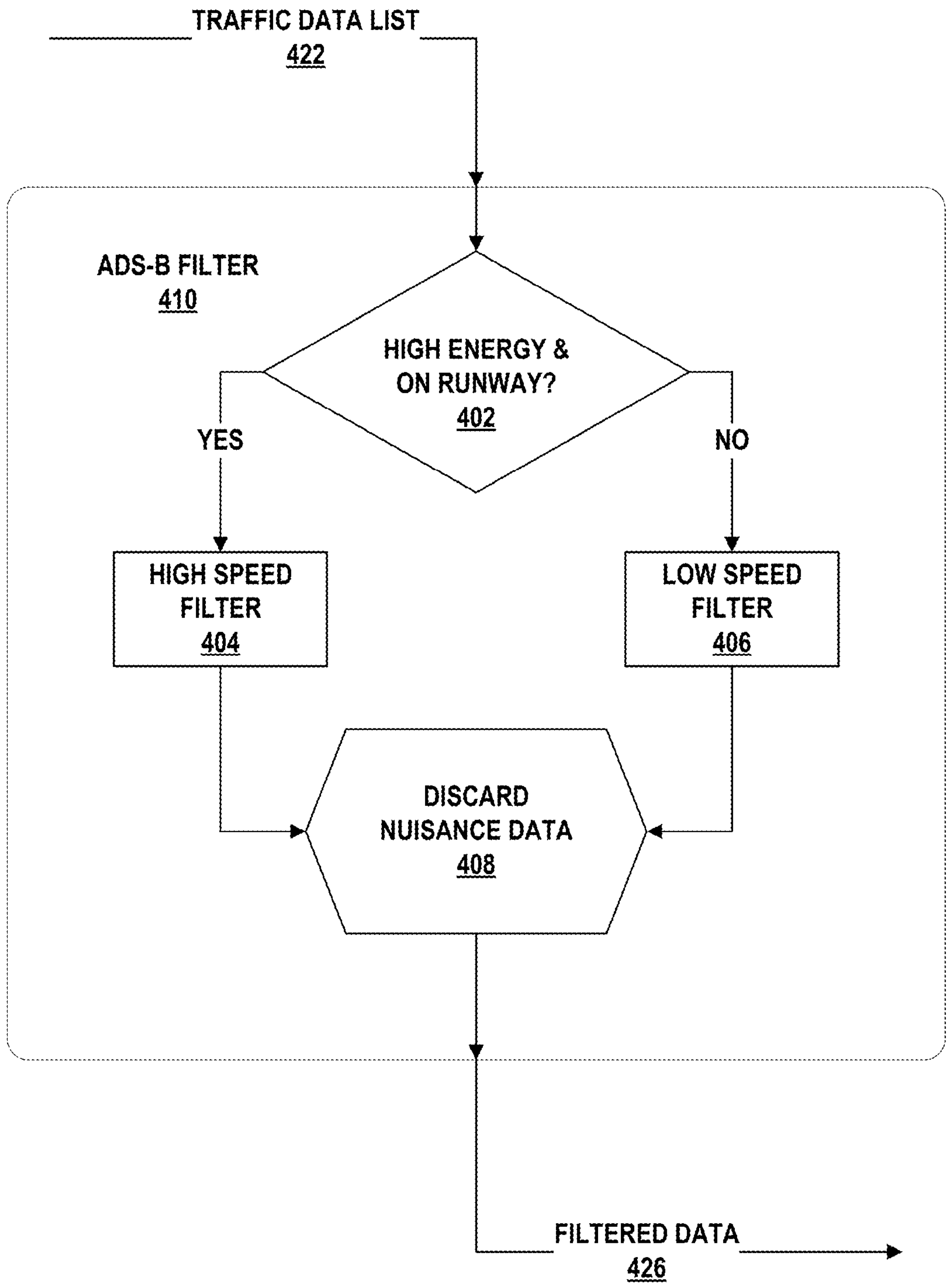
FIG. 4 is a flowchart illustrating an example implementation of a low-speed filter and a high-speed filter for the traffic data filter of this disclosure.

FIG. 4 is a flowchart illustrating an example implementation of a low-speed filter and a high-speed filter for the traffic data filter of this disclosure. ADS-B filter 410 is an example of ADS-B filter 310 of FIG. 3 as well as the ADS-B filter functions described above in relation to FIG. 2. Traffic data list 422 and filtered data 426 correspond to traffic data list 322 and filtered data 326 described above in relation to FIG. 3 and have the same functions and characteristics.

Processing circuitry may execute programming instructions for ADS-B filter 410 to determine whether the own-ship, or in some examples a target, is operating on or near a runway (402). ADS-B filter 410 may apply high speed filter 404 or low speed filter 406 depending on whether the own-ship is a risk for a high-energy conflict. In some examples, a high-energy conflicts may be defined as movement between two aircraft that potentially could lead to a high speed collision on the runway surface. The conflict prediction may be based whether the own-ship is on the surface and the conflicting traffic was airborne on approach, or when own-ship is airborne on approach and the conflicting traffic is intruding on the runway. In some examples, the processing circuitry (not shown in FIG. 4) may determine whether the own-ship vehicle is in a high-energy state based on one or more of own-ship speed, acceleration or other sensor inputs such as weight on wheels, engine state (e.g., forward thrust, reverse thrust, propellor angle setting) and other similar factors. In response to determining that the own-ship vehicle is operating on or near a runway, and/or is in a high energy state, (YES branch of 402) the processing circuitry may apply high-speed filter 404 to the received data point in traffic data list 422. In some examples the high-energy state may include a take-off state, landing state, rollout after landing, rejected take-off and so on.

In other examples, the processing circuitry may determine that the own-ship vehicle and the target are operating in a low energy state, and/or in an area away from a runway, such as a taxiway, passenger embark/debark area, refueling location, and so on (NO branch of 402). The processing circuitry may apply a low-speed filter 406 to the received data point. In some examples, when the own-ship vehicle is operating in a low energy state, such as taxiing on the runway, the processing circuitry may apply low speed filter 406. Processing circuitry for the own-ship vehicle, e.g., processing circuitry on board an aircraft or other vehicle, or in other examples, processing circuitry for the own-ship vehicle at a ground station, may determine whether the own-ship vehicle is in a low energy state based on one or more factors. Some examples of factors may include onboard equipment determining that the own-ship speed is less than a threshold speed, the engine state is less than threshold energy state (rpm, fuel flow, or similar measurements), brake status, thrust lever position or any other similar factor. In some examples the low-speed filter may include detection of ADS-B slow mode from the target, detection of a walking track error; and determination of whether the received data point is generated by a coasting function.

An ADS-B OUT system for each aircraft may output an ADS-B message, including aircraft ID, position, heading and so on, at different rates depending on the aircraft state, and some other factors. In some examples, when airborne, the ADS-B OUT system may transmit a message every second or twice a second. When on the surface, an ADS-B OUT system may transmit messages twice per second when moving, or every five seconds when stationary, e.g., less than a threshold speed. In this disclosure, "ADS-B slow mode" indicates that the ADS-B IN system receives a message from a target vehicle every five seconds, which indicates that the vehicle is stationary. Low speed filter 406 may be configured to detect when the target vehicle is transmitting in ADS-B slow mode.

As described above in relation to FIG. 3, in some examples, some aspects of ADS-B filter 410 may be implemented within the TCAS tracker, e.g., by a function executed by processing circuitry 340 that is executing the TCAS tracker functions. Some functions of low speed filter 406 may be implemented within the TCAS tracker, e.g., to detect the ADS-B slow mode (five seconds transmit intervals). For low speed filters 406 separate from the TCAS tracker, the processing circuitry of ADS-B filter 410 may detect same data in the last 5 positions, e.g., the processing circuitry may check if position is same, speed is same, heading is same.

In some examples, low speed filter 406 may be configured to detect a "walking track error" in a stationary target vehicle. The ADS-B OUT system in a target vehicle may transmit messages that indicate the vehicle is slowly deviating from the actual stationary, or low speed, position. The ADS-B messages received by ADS-B filter 410 for a target vehicle may appear that the vehicle is moving away from the actual position and walking back to the actual position. The cause may be based on errors in the GPS signals, e.g., reflections, or processing errors on the target vehicle, or some other root cause. Low speed filter 406 may be configured to detect this walking track error and flag the data point, or data points as outliers from the actual position.

In some examples, the TCAS tracker for the own-ship, e.g., TCAS tracker 304 of FIG. 3, may include an automatic "coasting" function. In the example in which the TCAS tracker expects a new data point, e.g., twice per second, and the TCAS tracker receives no data point, the internal coasting function may assume that the vehicle is moving at the last known heading and speed, then predict and generate an internal data point for the target. The coasting function may provide useful input while airborne at higher speeds. In some examples, a target aircraft may be moving along a taxiway and hold short at a runway entrance, then switch to slow mode, or the ADS-B message is not received, garbled and discarded, and so on. The own-ship TCAS tracker may incorrectly "coast" the target aircraft onto the runway, when the aircraft is still stationary and clear of the runway. Low speed filter 406 may be configured to detect 'coasting' data points and in some examples, may remove the coasting data points from filtered data 426. In some examples, data age for a received data point may be one parameter that low speed filter 406 may use to filter data points.

In some examples, the processing circuitry may discard the nuisance data 408. In some examples, as described above, the processing circuitry may substitute a previous data point for the discarded nuisance data point.

Figure 5:
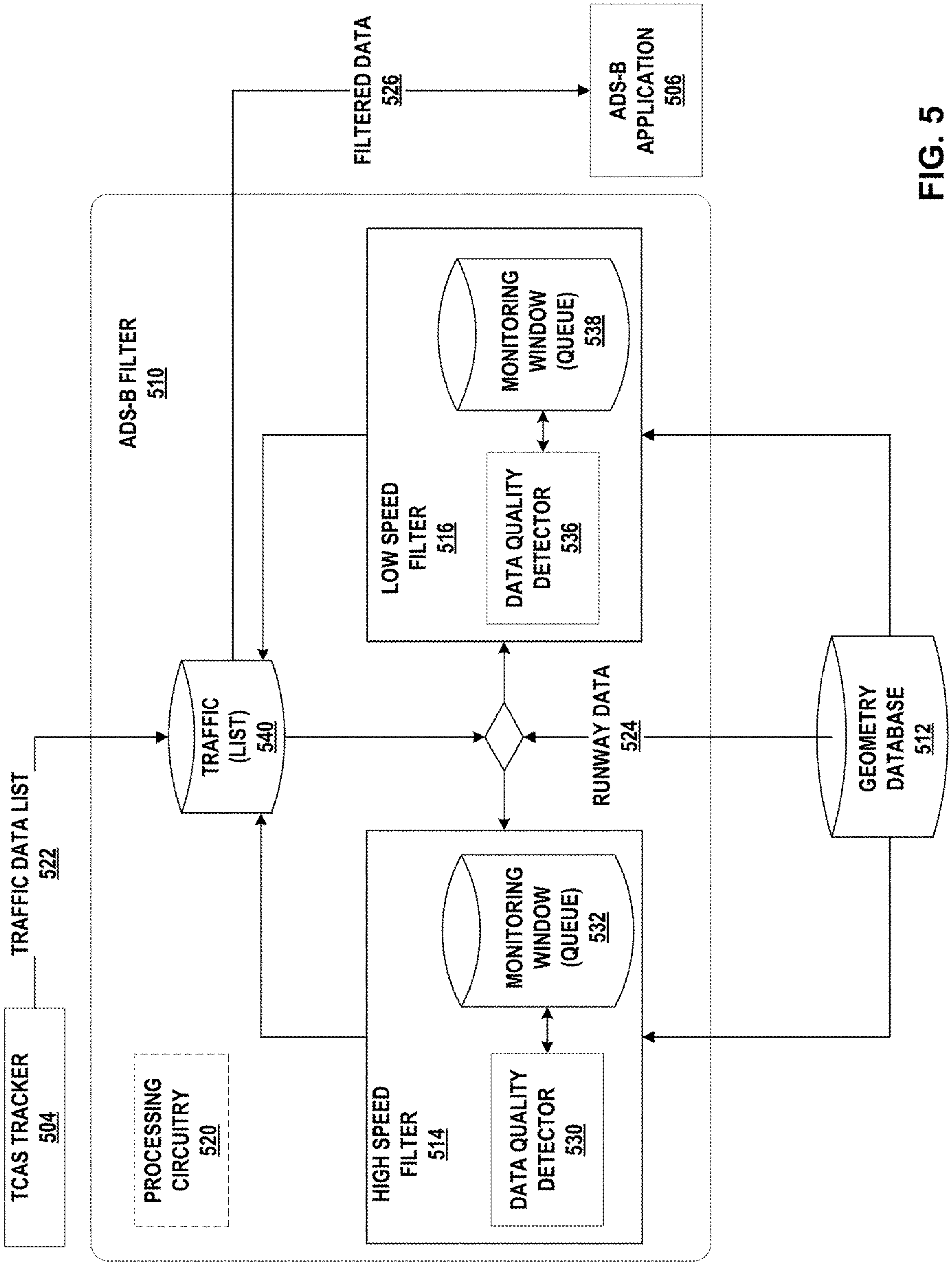
FIG. 5 is a block diagram illustrating a detailed view of one example implementation of the traffic data filter of this disclosure.

FIG. 5 is a block diagram illustrating a detailed view of one example implementation of the traffic data filter of this disclosure. ADS-B filter 510 is an example of ADS-B filters 310 and 410 of FIGS. 3 and 4 respectively, as well as an example of the ADS-B filter described above in relation to FIG. 2. TCAS tracker 504, traffic data list 522, filtered data 526 and ADS-B application 506 may have the same functions and characteristics as TCAS tracker 304, traffic data list 322, filtered data 326 and ADS-B application 306 described above in relation to FIG. 3. High speed filter 514 is an example of high speed filter 404 and low speed filter 516 is an example of low speed filter 406 described above in relation to FIG. 4. In some examples, ADS-B filter 510 may be implemented as a stand-alone device, connected to other avionics systems and may include processing circuitry 520, configured to perform the functions described in this disclosure. In other examples, other processing circuitry in the avionics suite for a vehicle may execute programming instructions to perform the functions of the ADS-B filter, as described above in relation to FIG. 2.

In the example of FIG. 5, processing circuitry may receive data points in traffic data list 522 and store data points at a memory location, e.g., traffic list 540. The processing circuitry may receive runway data 524, e.g., from a geometry database 512 and determine whether own-ship is operating on or near a runway. Processing circuitry may further determine the aircraft state, e.g., high energy, such as take-off, landing, or low energy to determine whether to apply high speed filter 514 or low speed filter 516.

When the processing circuitry, e.g., processing circuitry 520, determines that the own-ship is operating on or near a runway, the processing circuitry may update monitoring window. In other words, processing circuitry may add the new data point to monitoring window 532, also referred to as a queue, and discard the oldest traffic data point in the queue. For example, monitoring window 532 may include the last five data points, or some other number of data points. When ADS-B filter 510 receives a new data point for a specified target, the processing circuitry may discard oldest data point and add the new data point. As described above in relation to FIGS. 2-4, the processing circuitry may perform data quality detection 530, which may include outlier checks, track validity checks, e.g., comparing a location, heading etc. to known geometry from geometry database 512, and other data quality checks. In other words, data quality detector 530 may performs validity checks, e.g., kinematics on position, velocity, altitude and so on for data points in traffic data list 522. In response to determining that the track of a target is valid and in response to determining that the received data point is a positional outlier, then the processing circuitry may delete the new received data point and copy and add a previous data point to the traffic data stored at traffic list 540. ADS-B filter 510 may output an electronic signal, e.g., comprising filtered data 526, to ADS-B application 506 to perform threat computation on the filtered data to predict potential collision threats from the targets.

Similarly, in response to determining that an own-ship vehicle and/or the target are operating in an area away from a runway or operating in a low energy state, the processing circuitry may be configured to apply low-speed filter 516 to the received data point. Low speed filter 516 may update monitoring window 538 in a similar to that described above for the high speed filter and monitoring window 532. In some examples monitoring window 532 for the high speed filter may include more or few elements than monitoring window 538 for low speed filter 516. Low speed filter 516 may output filtered data for each target to traffic list 540 after determining whether to remove data points with data quality detector 536.

Figure 6:
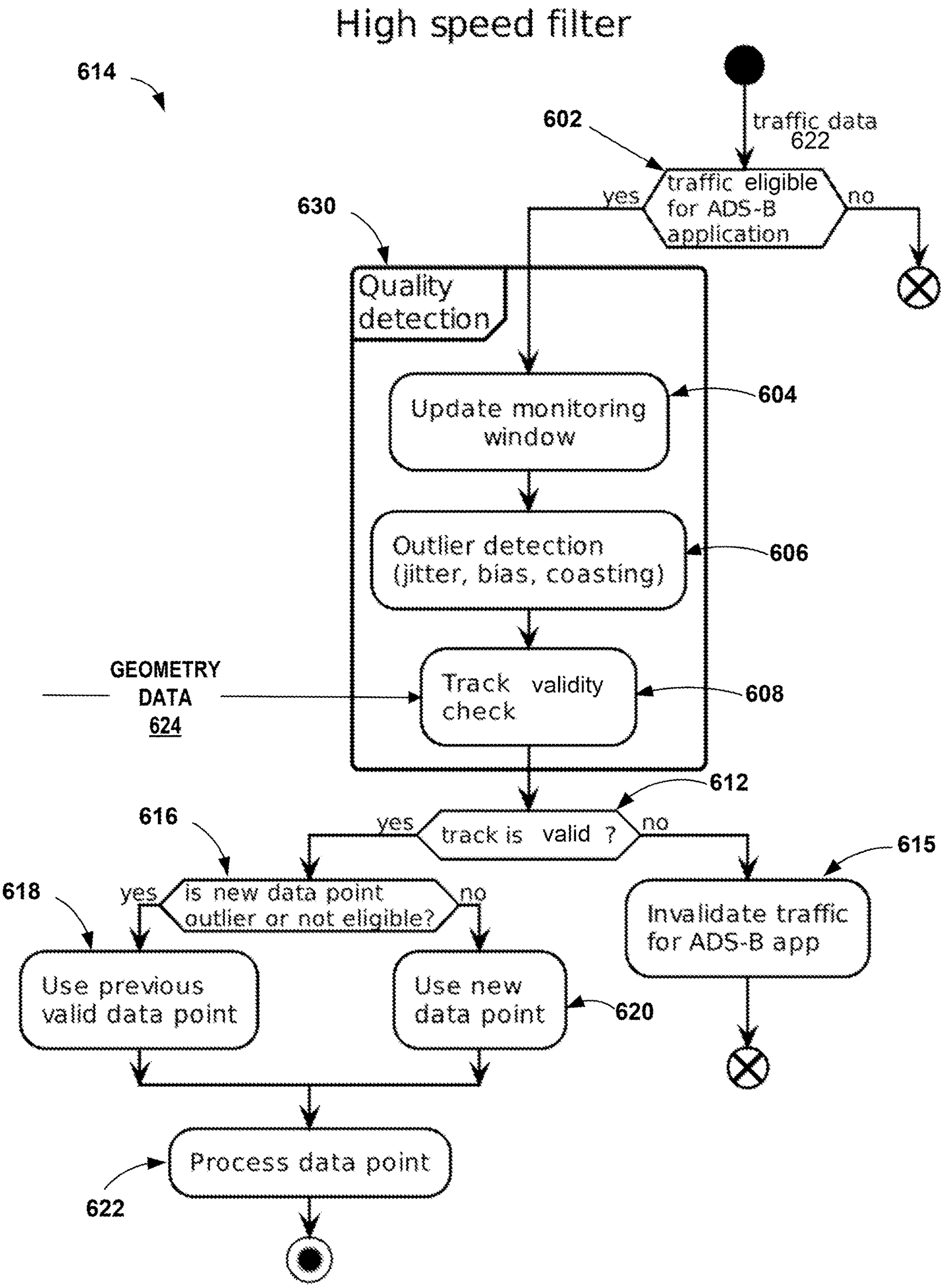
FIG. 6 is a flow diagram illustrating a detailed view of an example high speed traffic data filter of this disclosure.

FIG. 6 is a flow diagram illustrating a detailed view of an example high speed traffic data filter of this disclosure. High speed filter 614 is an example of high speed filters 404 and 514 described above in relation to FIGS. 4 and 5 respectively and may have the same functions and characteristics.

ADS-B receiver circuitry for a vehicle (not shown in FIG. 6) may receive traffic data 622. In some examples the ADS-B receiver circuitry may perform eligibility checks 602 on the traffic data, as described above in relation to FIG. 3. High speed filter 614 of the ADS-B filter may perform further quality detection 630 on the eligible data points in traffic data 622. As described above in relation to FIG. 5, processing circuitry executing the high speed filter functions of high speed filter 614 may update a monitoring window 604, which stores some predefined number of previous data points for each target. The number of data points in each monitoring window may change based upon the ground situation, number of other vehicles, e.g., aircraft that may be potential threats, own-ship status and so on. Processing circuitry may use the stored data points for each target in the monitoring window to perform positional outlier checks.

In some examples, the processing circuitry may execute programming instructions to processing circuitry is configured to establish the monitoring window at a memory location with successive data points received over time for one or more targets. The processing circuitry may store the successive data points for target in the monitoring window at the memory location. In some examples, the monitoring window is adjustable based on a time duration or based on a number of successive data points. For example, the monitoring window may store the most recent ten data points, or the monitoring window may be set to store all data points for a target received in the last five minutes. The "ten data points" and "five minutes" are just examples and the monitoring windows of the ADS-B filter of this disclosure may be set to any value. In some examples, in response to determining the received data point satisfies criteria for the positional outlier check, update the monitoring window by adding the received data point to the successive data points and discard the oldest data point of the successive data points.

In some examples, the positional outlier check may include tests for frozen data, jitter, bias, coasting, and so on, as described above. In this disclosure, bias for a set of data points may include a constant positional offset from the true position, e.g., caused by GPS receiver systematic error or constant multipath in one direction. Jitter may be interpreted as random errors within circle boundary that may have a Gaussian definition and variance around reported/true position.

In other words, the positional outlier check may check for jumping locations in the reported position from a target as well as whether the target speed, heading does not match or is not consistent between data points in the monitoring window. In contrast to other techniques, the positional outlier check of this disclosure may compare the set of points in the monitoring window for consistence with other points in the monitoring window, rather than not checking for location against a location threshold, speed against a speed threshold etc. In some examples, the amount or degree of consistency may be compared to a consistency threshold, but this is different than performing a calculation of speed based on reported position and determining that the computed speed is greater or less than a threshold.

The high speed filter may further perform a track validity check as described above in relation to FIGS. 2-5, e.g., to check the reported target location, speed, heading and so on against known geometry, e.g., based on geometry data 624 from a geometry database. For example, the ADS-B filter of this disclosure may monitor heading consistency by comparing reported heading and calculated traffic movement direction. If the difference between the reported heading and calculated traffic movement exceeds specific threshold, the processing circuitry may add a flag to the traffic indicating that reported heading is incorrect. For example, to perform a heading consistency check, the processing circuitry may calculate a projected traffic movement direction based on location data in the successive data points. The processing circuitry may compare reported heading data in the successive data points to the projected movement direction, then in response to the reported heading data differing from the projected movement direction by greater than the threshold amount, the processing circuitry is configured to flag the data point, or otherwise indicate that the target has an incorrect heading.

When performing the track validity check, the processing circuitry may use a spatial positioning uncertainty range to determine whether the target location and heading are within a threshold distance from the known geometry. In some examples the threshold distance may be adjustable for the ADS-B filter via a user interface.

In some examples, the track validity check may further include monitoring if a traffic is very unstable, e.g., has the processing circuitry frequently removed the traffic from the data sent to the collision alerting system because of errors in the received data. Such an unstable target may be inhibited for an extended time. In other words, in response to one or more of deleting the received data point or removing the target from the traffic data, processing circuitry may flag the target. For subsequently received data, the processing circuitry may determine for each respective target, whether, for a previously received data point, the processing circuitry may have deleted the received data point or removed the target from the traffic data. In response to determining, for previously received data point of the respective target that the processing circuitry performed one or more of deleting the received data point or remove the target from the traffic data, then the processing circuitry may inhibit received data points for the respective target from the target data, for a predetermined duration.

As described above in relation to FIG. 2, in response to determining that the track of the target is invalid (612), the processing circuitry may remove the target from the traffic data, e.g., invalidate the traffic data point for the ADS-B collision prediction application (615). In some examples, the programming instructions may cause the processing circuitry to simply discard known bad points to avoid nuisance prediction calculations by SURF IA. In other examples, the processing circuitry may discard a data point determined to be erroneous, then the processing circuitry may predict what point should have been and insert what the expected data point ought to be into the filtered traffic data.

In response to determining that the track of the target is valid 612 and in response to determining that the received data point is a positional outlier 616, then the processing circuitry may delete the received data point and add a previously valid data point 618 to the traffic data. Processing circuitry may use new valid data points 620 and release the valid data points into the filtered traffic data and process the data point for the target 622.

Figure 7:
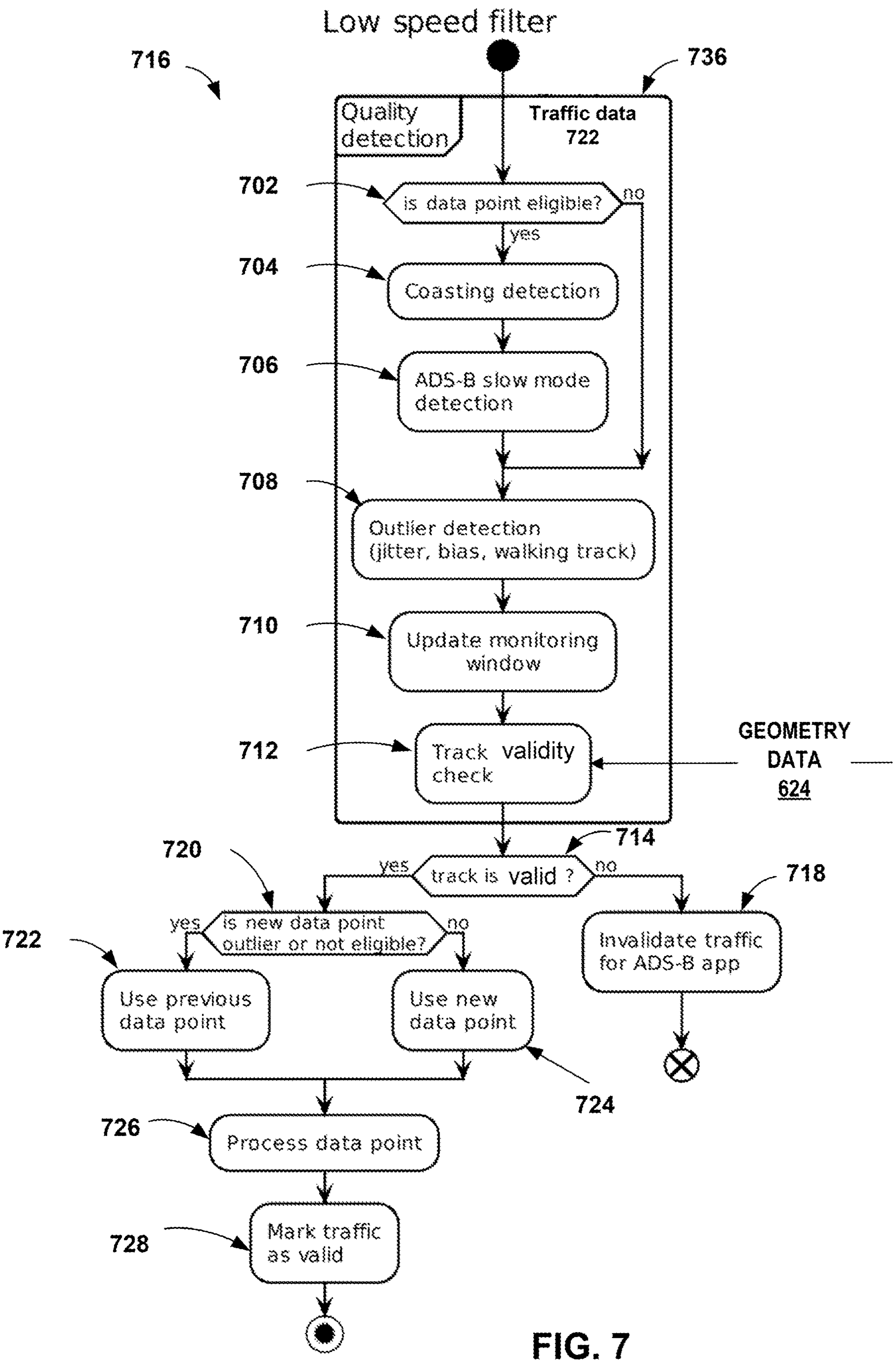
FIG. 7 is a flow diagram illustrating a detailed view of an example low speed traffic data filter of this disclosure.

FIG. 7 is a flow diagram illustrating a detailed view of an example low speed traffic data filter of this disclosure. Low speed filter 716 is an example of low speed filters 406 and 516 described above in relation to FIGS. 4 and 5 respectively and may have the same functions and characteristics.

As with high speed filter 614 described above in relation to FIG. 6, ADS-B receiver circuitry for a vehicle (not shown in FIG. 7) may receive traffic data 722 and perform quality detection checks 736 on the received data points, including eligibility checks 702, coasting detection 704, ADS-B slow mode detection 706, and positional outlier detection 708 as described above in relation to FIGS. 1-6. Processing circuitry may execute programming instructions to perform a track validity check 712 based on comparing reported position, heading and so on against known geometry data 624.

As described above in relation to FIGS. 2 and 6, in response to determining that the track of the target is invalid (714), the processing circuitry may remove the target from the traffic data, e.g., invalidate the traffic data point for the ADS-B collision prediction application (718). In response to determining that the track of the target is valid and in response to determining that the received data point is a positional outlier 720, then the processing circuitry may delete the received data point and add a previously valid data point 722 to the traffic data. Processing circuitry may use new valid data points 724 and release the valid data points into the filtered traffic data and process the data point for the target 726. In some examples, low speed filter 716, as well as high speed filter 614, may mark the traffic as valid, e.g., by adding a flag to the data point in the filtered traffic data.

In one or more examples, the functions described above may be implemented in hardware, software, firmware, or any combination thereof. For example, the various components of FIGS. 2-7, such as processing circuitry 220, ADS-B filter 310, the high speed filter and low speed filter, and so on may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein, such as processing circuitry 520, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Clause 1: A system comprising processing circuitry configured to: receive traffic data comprising target state information of a target derived from received Automatic Dependent Surveillance-Broadcast (ADS-B) messages, wherein the target state information comprises target location, target heading and target speed; filter the received traffic data to remove data points from the received traffic data by performing the following steps: receive a data point comprising the target state information; perform a positional outlier check on the received data point, wherein the positional outlier check comprises to check consistency of a respective location, respective heading and respective speed information between successive data points; perform a track validity check of a track of the target based on the received data point, wherein the track validity check comprises to check the target location and heading against known geometry; in response to determining that the track of the target is invalid, remove the target from the traffic data; and in response to determining that the track of the target is valid and in response to determining that the received data point is a positional outlier, then: delete the received data point and add a previous data point to the traffic data; and output an electronic signal comprising the traffic data as filtered traffic data.

Clause 2: The system of clause 1, wherein the processing circuitry is configured for an own-ship vehicle to: determine whether the own-ship vehicle is operating on or near a runway; determine whether the own-ship vehicle is in a high-energy state based on one or more of own-ship: speed, and acceleration; and in response to determining that the own-ship vehicle is operating on or near a runway, and is in a high energy state, apply a high-speed filter to the received data point.

Clause 3: The system of clause 2, wherein the high energy state comprises a take-off state.

Clause 4: The system of any of clauses 1 through 3, wherein the processing circuitry is configured to, for an own-ship vehicle: determine whether the own-ship vehicle or the target is operating on or near a runway; in response to determining that the own-ship vehicle or the target is operating on or near a runway, apply a high-speed filter to the received data point.

Clause 5: The system of any of clauses 1 through 4, wherein in response to determining that an own-ship vehicle and the target are operating in an area away from a runway, the processing circuitry is configured to apply a low-speed filter to the received data point, wherein the low-speed filter includes: detection of ADS-B slow mode from the target; detection of a walking track error; and determination of whether the received data point is generated by a coasting function.

Clause 6: The system of any of clauses 1 through 5, further includes runway location, heading and dimensions, taxiway and ramp location and dimensions, airport structure location and dimensions, location and dimensions of terrain and other hazards, and aircraft arrival and departure paths.

Clause 7: The system of any of clauses 1 through 6, wherein to perform the positional outlier check, the processing circuitry is configured to: establish a monitoring window at a memory location of successive data points received over time for the target; store the successive data points for target in the monitoring window at the memory location, wherein the monitoring window is adjustable based on a time duration or based on a number of successive data points; and in response to determining the received data point satisfies criteria for the positional outlier check, update the monitoring window by adding the received data point to the successive data points and discard an oldest data point of the successive data points.

Clause 8: The system of clause 7, wherein to perform the positional outlier check the processing circuitry is further configured to execute programming instructions to check for one or more of: frozen data, walking track for a stopped target, bias and jitter.

Clause 9: The system of any of clauses 7 and 8, wherein to perform the positional outlier check the processing circuitry is further configured to perform a heading consistency check, the heading consistency check includes calculate a projected traffic movement direction based on location data in the successive data points; compare reported heading data in the successive data points to the projected movement direction; and in response to the reported heading data differing from the projected movement direction by greater than a threshold amount, the processing circuitry is configured to flag the data point as having an incorrect heading.

Clause 10: The system of any of clauses 1 through 9, wherein to perform the track validity check, the processing circuitry is configured to use a spatial positioning uncertainty range to determine whether the target location and heading are within a threshold distance from the known geometry.

Clause 11: The system of any of clauses 1 through 10, wherein to perform the track validity check further comprises: in response to one or more of: deleting the received data point or removing the target from the traffic data, flag the target; determine for a respective target, whether, for a previously received data point, the processing circuitry either: deleted the received data point or removed the target from the traffic data, and in response to determining, that for previously received data point of the respective target the processing circuitry: deleted the received data point or removed the target from the traffic data, inhibit received data points for the respective target from the target data, for a predetermined duration.

Clause 12: The system of clause 11, wherein to inhibit the received data points for the respective target comprises any combination of: delete at least two previously received data points; or remove the respective target from the traffic data at least twice.

Clause 13: The system of any of clauses 1 through 12, further includes a duration of the monitoring window for performing the positional outlier check; and a spatial positioning uncertainty range for performing the track validity check.

Clause 14: The system of any of clauses 1 through 13, further includes execute programming instructions comprising a cockpit display of traffic information (CDTI) application to process the electronic signal; and output the electronic signal to a display of the user interface.

Clause 15: The system of any of clauses 1 through 14, wherein the target state information further comprises one or more target eligibility flags, wherein the processing circuitry is further configured to remove the target from the traffic data based on the one or more target eligibility flags.

Clause 16: A method comprising receiving, by processing circuitry, traffic data comprising target state information of a target derived from received Automatic Dependent Surveillance-Broadcast (ADS-B) messages, wherein the target state information comprises target location, target heading and target speed; filtering, by processing circuitry, the received traffic data to remove data points from the received traffic data by performing the following steps: receiving a data point comprising the target state information; performing a positional outlier check on the received data point, wherein the positional outlier check comprises to check consistency of a respective location, respective heading and respective speed information between successive data points; performing a track validity check of a track of the target based on the received data point, wherein the track validity check comprises to check the target location and heading against known geometry; in response to determining that the track of the target is invalid, removing the target from the traffic data; and in response to determining that the track of the target is valid and in response to determining that the received data point is a positional outlier, then: deleting the received data point and adding a previous data point to the traffic data; and outputting an electronic signal comprising the traffic data as filtered traffic data.

Clause 17: The method of clause 16, further comprising: in response to determining that an own-ship vehicle and the target are operating in an area away from a runway, applying a low-speed filter to the received data point, wherein the low-speed filter includes: detecting ADS-B slow mode from the target; detecting of a walking track error; and determining whether the received data point is generated by a coasting function.

Clause 18: A non-transitory computer-readable storage medium comprising instructions that, when executed, cause one or more processors of a computing device to: receive traffic data comprising target state information of a target derived from received Automatic Dependent Surveillance-Broadcast (ADS-B) messages, wherein the target state information comprises target location, target heading and target speed; filter the received traffic data to remove data points from the received traffic data by performing the following steps: receive a data point comprising the target state information; perform a positional outlier check on the received data point, wherein the positional outlier check comprises to check consistency of a respective location, respective heading and respective speed information between successive data points; perform a track validity check of a track of the target based on the received data point, wherein the track validity check comprises to check the target location and heading against known geometry; in response to determining that the track of the target is invalid, remove the target from the traffic data; and in response to determining that the track of the target is valid and in response to determining that the received data point is a positional outlier, then: delete the received data point and add a previous data point to the traffic data; and output an electronic signal comprising the traffic data as filtered traffic data.

Clause 19: The non-transitory computer-readable storage medium of clause 18, further includes determine whether the own-ship vehicle is operating on or near a runway; determine whether the own-ship vehicle is in a high-energy state based on one or more of own-ship: speed, and acceleration; and in response to determining that the own-ship vehicle is operating on or near a runway, and is in a high energy state, apply a high-speed filter to the received data point.

Clause 20: The non-transitory computer-readable storage medium of any of clauses 18 and 19, wherein the instructions cause the programmable processor to: determine whether an own-ship vehicle and the target are operating in an area away from a runway, in response to determining that the own-ship vehicle and the target are operating in an area away from a runway, the processing circuitry is configured to apply a low-speed filter to the received data point, wherein the low-speed filter includes: detection of ADS-B slow mode from the target; detection of a walking track error; and determination of whether the received data point is generated by a coasting function.

Various examples of the disclosure have been described. These and other examples are within the scope of the following claims.

What is claimed is:

1. A system comprising:

a memory; and processing circuitry operatively coupled to the memory, the processing circuitry configured to:

receive traffic data comprising target state information of a target derived from received Automatic Dependent Surveillance-Broadcast (ADS-B) messages, wherein the target state information comprises a target location, a target heading, and a target speed; and filter the received traffic data to remove data points from the received traffic data, wherein to filter the received traffic data, the processing circuitry is further configured to:

receive a data point comprising the target state information;

perform a positional outlier check on the received data point, wherein to perform the positional outlier check, the processing circuitry is configured to check consistency of a respective location, respective heading, and respective speed information between successive data points;

perform a track validity check of a track of the target based on the received data point, wherein to perform the track validity check, the processing circuitry is configured to check the target location and heading against known geometry, wherein to check the target location and heading against known geometry comprises at least to compare the target location to a location and dimensions of terrain at a location in which horizontal accuracy is a factor;

in response to determining that the track of the target is invalid, remove the target from the received traffic data;

in response to determining that the track of the target is valid and in response to determining that the received data point is a positional outlier, delete the received data point and add a previous data point to the received traffic data stored at the memory and output an electronic signal comprising the received traffic data as filtered traffic data; and determine whether an own-ship vehicle is in a high energy state or a low energy state;

in response to determining that the own-ship vehicle is in a low energy state, apply a low-speed filter to the received data point, wherein to apply the low-speed filter the processing circuitry is configured to:

detect an ADS-B slow mode from the target, wherein to detect the ADS-B slow mode from the target is based on determining timing of receiving the data point from the target;

detect a walking track error, wherein to detect the walking track error, the processing circuitry is configured to determine that the target is slowly deviating from the actual stationary, or low speed, position; and determine whether the received data point is generated by a coasting function, wherein the coasting function is configured to assume that the target is moving at the last known heading and speed in response to not receiving an expected data point and then predict and generate an internal data point for the target.

2. The system of claim 1, wherein to filter the received traffic data the processing circuitry is further configured for an own-ship vehicle to:

determine whether the own-ship vehicle is operating on or near a runway;

determine whether the own-ship vehicle is in a high-energy state based on one or more of own-ship speed or acceleration; and in response to determining that the own-ship vehicle is operating on or near a runway, and is in a high energy state, apply a high-speed filter to the received data point.

3. The system of claim 2, wherein the high energy state comprises a take-off state.

4. The system of claim 2, wherein to determine whether the own-ship vehicle is in a high-energy state is based on one or more of: own-ship speed, own-ship engine status, weight on wheels sensor status, and brake status.

5. The system of claim 1, further comprising a database, wherein to check the target location and heading against known geometry, the processing circuitry is configured to retrieve information from the database including one or more of: geometry of one or more airport features, the features comprising: runway location, heading and dimensions, taxiway and ramp location and dimensions, airport structure location and dimensions, the location and dimensions of terrain and of other hazards, and aircraft arrival and departure paths.

6. The system of claim 1, wherein to perform the positional outlier check, the processing circuitry is configured to:

establish a monitoring window at a memory location of successive data points received over time for the target;

store the successive data points for target in the monitoring window at the memory location, wherein the monitoring window is adjustable based on a time duration or based on a number of successive data points; and in response to determining that the received data point satisfies criteria for the positional outlier check, update the monitoring window, wherein to update the monitoring window, the processing circuitry is configured to add the received data point to the successive data points and discard an oldest data point of the successive data points.

7. The system of claim 6, wherein to perform the positional outlier check, the processing circuitry is further configured to check for one or more of frozen data, walking track for a stopped target, bias, or jitter.

8. The system of claim 6, wherein to perform the positional outlier check, the processing circuitry is further configured to perform a heading consistency check, the heading consistency check comprising:

calculating a projected traffic movement direction based on location data in the successive data points;

comparing reported heading data in the successive data points to the projected movement direction; and in response to the reported heading data differing from the projected movement direction by greater than a threshold amount, flagging the data point as having an incorrect heading.

9. The system of claim 1, wherein to perform the track validity check, the processing circuitry is configured to use a spatial positioning uncertainty range to determine whether the target location and heading are within a threshold distance from the known geometry.

10. The system of claim 1, wherein to perform the track validity check, the processing circuit is further configured to:

in response to one or more of deleting the received data point or removing the target from the traffic data:

determine for a respective target, whether, for a previously received data point, the processing circuitry either deleted the received data point or removed the target from the traffic data, and in response to determining, that for previously received data point of the respective target the processing circuitry deleted the received data point or removed the target from the traffic data, inhibit received data points for the respective target from the traffic data, for a predetermined duration.

11. The system of claim 10, wherein to inhibit the received data points for the respective target, the processing circuitry is configured to:

delete at least two previously received data points; or remove the respective target from the traffic data at least twice.

12. The system of claim 1, further comprising a user interface operably connected to the processing circuitry, wherein the processing circuitry is further configured to receive a signal from the user interface comprising instructions to adjust:

a duration of a monitoring window for performing the positional outlier check; and a spatial positioning uncertainty range for performing the track validity check.

13. The system of claim 1, further comprising a user interface operably connected to the processing circuitry, wherein the processing circuitry is further configured to:

execute programming instructions comprising a cockpit display of traffic information (CDTI) application to process the electronic signal; and output the electronic signal to a display of the user interface.

14. The system of claim 1, wherein the target state information further comprises one or more target eligibility flags, wherein the processing circuitry is further configured to remove the target from the traffic data based on the one or more target eligibility flags.

15. A method comprising:

receiving, by processing circuitry, traffic data comprising target state information of a target derived from received Automatic Dependent Surveillance-Broadcast (ADS-B) messages, wherein the target state information comprises target location, target heading and target speed;

filtering, by processing circuitry, the received traffic data to remove data points from the received traffic data, wherein filtering the received traffic data comprises:

receiving a data point comprising the target state information;

performing a positional outlier check on the received data point, wherein the positional outlier check comprises to check consistency of a respective location, respective heading and respective speed information between successive data points;

performing a track validity check of a track of the target based on the received data point, wherein the track validity check comprises to check the target location and heading against known geometry, wherein to check the target location and heading against known geometry comprises at least to compare the target location to a location and dimensions of terrain at a location in which horizontal accuracy is a factor;

in response to determining that the track of the target is invalid, removing the target from the traffic data; and in response to determining that the track of the target is valid and in response to determining that the received data point is a positional outlier, deleting the received data point and add a previous data point to the traffic data and outputting an electronic signal comprising the traffic data as filtered traffic data; and determining whether an own-ship vehicle is in a high energy state or a low energy state;

in response to determining that the own-ship vehicle is in a low energy state, applying, by the processing circuitry a low-speed filter to the received data point, wherein applying the low-speed filter includes:

detecting an ADS-B slow mode from the target, wherein to detect the ADS-B slow mode from the target is based on determining timing of receiving the data point from the target;

detecting of a walking track error, wherein to detect the walking track error, the processing circuitry is configured to determine that the target is slowly deviating from the actual stationary, or low speed, position; and determining whether the received data point is generated by a coasting function, wherein the processing circuitry executing the coasting function is configured to assume that the target is moving at the last known heading and speed and when the processing circuitry does not receive an expected data point at an expected time, then predict and generate an internal data point for the target based on the last known heading and speed.

16. A non-transitory computer-readable storage medium comprising instructions that, when executed, cause a programmable processor of a computing device to:

receive traffic data comprising target state information of a target derived from received Automatic Dependent Surveillance-Broadcast (ADS-B) messages, wherein the target state information comprises target location, target heading and target speed;

filter the received traffic data to remove data points from the received traffic data, wherein to filter the received traffic data, the instructions cause the programmable processor to:

receive a data point comprising the target state information;

perform a positional outlier check on the received data point, wherein the positional outlier check comprises to check consistency of a respective location, respective heading and respective speed information between successive data points;

perform a track validity check of a track of the target based on the received data point, wherein the track validity check comprises to check the target location and heading against known geometry, wherein to check the target location and heading against known geometry comprises at least to compare the target location to a location and dimensions of terrain at a location in which horizontal accuracy is a factor;

in response to determining that the track of the target is invalid, remove the target from the traffic data; and in response to determining that the track of the target is valid and in response to determining that the received data point is a positional outlier, delete the received data point and add a previous data point to the traffic data; and output an electronic signal comprising the traffic data as filtered traffic data; and determine whether an own-ship vehicle is in a high energy state or a low energy state, wherein in response to determining that the own-ship vehicle is in a low energy state, the instructions cause the processing circuitry to apply a low-speed filter to the received data point, wherein to apply the low-speed filter includes:

detection of ADS-B slow mode from the target, wherein to detect the ADS-B slow mode from the target is based on determining timing of receiving the data point from the target;

detection of a walking track error, wherein to detect the walking track error, the instructions cause the processing circuitry to determine that the target is slowly deviating from the actual stationary, or low speed, position; and determination of whether the received data point is generated by a coasting function, wherein the instructions cause the processing circuitry executing the coasting function to assume that the target is moving at the last known heading and speed and when the processing circuitry does not receive an expected data point at an expected time, then predict and generate an internal data point for the target.

17. The non-transitory computer-readable storage medium of claim 16, wherein to filter the received traffic data, the instructions further cause the programmable processor for an own-ship vehicle to:

determine whether the own-ship vehicle is operating on or near a runway;

determine whether the own-ship vehicle is in a high-energy state based on one or more of own-ship speed and acceleration; and in response to determining that the own-ship vehicle is operating on or near a runway, and is in a high energy state, apply a high-speed filter to the received data point.

* * * * *